(12) United States Patent
Amann

(10) Patent No.: US 8,593,271 B2
(45) Date of Patent: Nov. 26, 2013

(54) METHOD FOR THE AVOIDANCE OR MITIGATION OF A COLLISION, CONTROL APPARATUS FOR A DRIVER ASSISTANCE SYSTEM AND VEHICLE

(75) Inventor: Karl-Heinz Amann, Hofheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 288 days.

(21) Appl. No.: 13/049,290

(22) Filed: Mar. 16, 2011

(65) Prior Publication Data

US 2011/0227713 A1  Sep. 22, 2011

(30) Foreign Application Priority Data

Mar. 16, 2010 (DE) .......................... 10 2010 011 497

(51) Int. Cl.
*B60Q 1/00* (2006.01)
(52) U.S. Cl.
USPC .......................... 340/435; 340/903; 340/573.1
(58) Field of Classification Search
USPC ................. 340/435, 436, 903, 438, 439, 441, 340/443–444, 463, 571, 572.1, 573.1
See application file for complete search history.

(56) References Cited

U.S. PATENT DOCUMENTS

| | | | |
|---|---|---|---|
| 6,282,483 B1* | 8/2001 | Yano et al. ....................... 701/96 |
| 2002/0044048 A1 | 4/2002 | Watanabe et al. | |
| 2002/0067287 A1 | 6/2002 | Delcheccolo et al. | |
| 2004/0193374 A1* | 9/2004 | Hac et al. ....................... 701/301 |
| 2009/0045928 A1* | 2/2009 | Rao et al. ....................... 340/435 |
| 2009/0164083 A1* | 6/2009 | Thiel .............................. 701/96 |
| 2009/0212930 A1* | 8/2009 | Pfeiffer et al. ................ 340/435 |

FOREIGN PATENT DOCUMENTS

| | | |
|---|---|---|
| DE | 19845568 A1 | 10/1999 |
| DE | 10133283 A1 | 1/2003 |
| DE | 102008061304 A1 | 7/2009 |
| DE | 102008040627 A1 | 2/2010 |
| WO | 2007124704 A1 | 11/2007 |

OTHER PUBLICATIONS

German Patent Office, German Search Report for German Application No. 102010011497.9, Oct. 27, 2010.

\* cited by examiner

*Primary Examiner* — Daniel Previl
(74) *Attorney, Agent, or Firm* — Ingrassia Fisher & Lorenz, P.C.

(57) ABSTRACT

A method is provided for the avoidance or at least mitigation of a collision between a first vehicle driving in a first lane and a second vehicle driving in a second lane when the second vehicle changes lane from the second lane o to the first lane. The method includes, but is not limited to the following steps. An impending lane change of the second vehicle from the second lane to the first lane is determined, a first distance of the second vehicle from the first vehicle and a first position of the second vehicle are determined. Furthermore, the determined first distance d1 of the second vehicle from the first vehicle is then compared with a first predetermined threshold value. The first predetermined threshold value is direction-dependent and the determined first distance of the second vehicle from the first vehicle is compared with the first predetermined threshold value in the direction of the determined first position of the second vehicle. Further, a first warning message to the second vehicle is automatically output by means of at least one signal device of the first vehicle if $d1 \leq d0,1$.

18 Claims, 9 Drawing Sheets

METHOD FOR THE AVOIDANCE OR MITIGATION OF A COLLISION, CONTROL APPARATUS FOR A DRIVER ASSISTANCE SYSTEM AND VEHICLE

CROSS-REFERENCE TO RELATED APPLICATION

This application claims priority to German Patent Application No. 102010011497.9, filed Mar. 16, 2010, which is incorporated herein by reference in its entirety.

TECHNICAL FIELD

The technical relates to a method for the avoidance or mitigation of a collision between a first vehicle and a second vehicle when the second vehicle changes lane, a control apparatus for a driver assistance system, a vehicle having a control apparatus for a driver assistance system, a computer program and a computer-readable medium.

BACKGROUND

Transmission of vehicle-relevant data of a vehicle via mobile communication is known from DE 10 2008 061 304 A1. According to one exemplary embodiment, an ignition-key-radio technology is used in addition to WLAN-based communication in a vehicle in order to communicate with other vehicles. In this case, only selected data which have changed significantly are transmitted by means of the ignition-key-radio technology. The remaining data are not transmitted or only saved for the WLAN communication.

It is at least one object to provide a method for the avoidance or mitigation of a collision between a first vehicle driving in a first lane and a second vehicle driving in a second lane when the second vehicle changes lane from the second lane to the first lane, a control apparatus for a driver assistance system, a vehicle having a control apparatus for a driver assistance system, a computer program and a computer-readable medium which can reduce the frequency of accidents in the driving situation.

SUMMARY

In a first embodiment, a method is provided for the avoidance or mitigation of a collision between a first vehicle driving in a first lane and a second vehicle driving in a second lane when the second vehicle changes lane from the second lane to the first lane, wherein the method comprises the following steps. An impending lane change of the second vehicle from the second lane to the first lane is determined by means of at least one first detecting apparatus of the first vehicle. A first distance $d1$ of the second vehicle from the first vehicle is made by means of at least one second detecting apparatus of the first vehicle and a first position of the second vehicle is determined by means of at least one third detecting apparatus of the first vehicle. Furthermore, the determined first distance $d1$ of the second vehicle from the first vehicle is then compared with a first predetermined threshold value $d0,1$, wherein the first predetermined threshold value $d0,1$ is direction-dependent and wherein the determined first distance $d1$ of the second vehicle from the first vehicle is compared with the first predetermined threshold value $d0,1$ in the direction of the determined first position of the second vehicle. Further, a first warning message to the second vehicle is automatically output by means of at least one signal device of the first vehicle if $d1 \leq d0,1$.

This first embodiment of the method extends the spectrum of possible reactions of all those involved to a critical driving situation in the form of the impending lane change of the second vehicle from the second lane to the first lane. In this case, the consideration is taken as the starting point that known active safety systems are aimed at warning the vehicle drive and evasion manoeuvring of the vehicles which recognise a critical driving situation. The first embodiment describes a method as to how other road users, in particular the causer of a critical driving situation in the case of a thoughtless lane change, i.e. how the second vehicle or the driver of the second vehicle can be warned. As a result, the accident frequency in this typical driving situation can advantageously be reduced.

The determination of the first position of the second vehicle can include determining a position of the second vehicle relative to a first vehicle, where the determined first distance $d1$ of the second vehicle from the first vehicle is compared with the first predetermined threshold value $d0,1$ in the direction of the determined position of the second vehicle relative to the first vehicle.

In a further embodiment of the method, the first predetermined threshold value $d0,1$ is additionally speed-dependent. In this embodiment a determination of a speed $v$ of the second vehicle is made and the determined first distance $d1$ of the second vehicle from the first vehicle is compared with the first predetermined threshold value $d0,1$ in the direction of the determined first position of the second vehicle and dependent on the determined speed $v$ of the second vehicle.

The determination of the speed $v$ of the second vehicle can include a determination of the speed of the second vehicle relative to the first vehicle, wherein the determined first distance $d1$ of the second vehicle from the first vehicle is compared with the first predetermined threshold value $d0,1$ in the direction of the determined first position of the second vehicle and dependent on the determined speed $v$ of the second vehicle relative to the first vehicle.

The two last-mentioned embodiments advantageously make it possible to take account of the speed of the second vehicle, in the last-mentioned embodiment in particular the relative speed of the second vehicle relative to the first vehicle, for the first predetermined threshold value $d0,1$ and therefore an automatic output of the first warning message as a function of the speed of the second vehicle in addition to the position of the second vehicle and the distance of the second vehicle from the first vehicle.

In a further embodiment the signal device of the first vehicle comprises at least one headlamp and the automatic output of the first warning message to the second vehicle includes an actuation of the at least one headlamp. This embodiment is suitable for warning the driver of the second vehicle by means of automatic headlamp flasher. This is particularly advantageous if the second vehicle changes to the first lane too closely in front of the first vehicle.

In a further embodiment the signal device of the first vehicle comprises at least one horn and the automatic output of the first warning message to the second vehicle includes an actuation of the at least one horn. This embodiment is particularly suitable for warning the driver of the second vehicle by means of an automatic horn if the second vehicle would like to change to the first lane directly alongside the first vehicle.

The at least one first detecting apparatus, the at least one second detecting apparatus and/or the at least one third detecting apparatus include at least one element selected from the group consisting of an optical sensor, in particular a camera, an acoustic sensor, in particular an ultrasound sensor, a radar sensor and a lidar sensor. The said elements are increasingly integrated in vehicles, with the result that the method can be carried out at least partly by means of components already available in the first vehicle.

In a preferred embodiment, the at least one first detecting apparatus, the at least one second detecting apparatus and/or the at least one third detecting apparatus have at least one common sensor, i.e. at least two of the three detecting apparatuses have a common sensor. As a result, the number of requisite components is advantageously reduced.

In a further embodiment the determination of the impending lane change of the second vehicle from the second lane to the first lane comprises the following steps. A driving course of the first vehicle is determined and a driving course of the second vehicle is determined. In addition, the determined driving course of the second vehicle is compared with the determined driving course of the first vehicle. The determined driving course of the first vehicle can include a future driving course, i.e. at least one future position of the first vehicle and/or the determined driving course of the second vehicle can include a future driving course, i.e. a future position of the second vehicle. An approach of the driving course of the second vehicle to the driving course of the first vehicle can be assessed as an impending lane change of the second vehicle from the second lane to the first lane.

In a further embodiment, the determination of the impending lane change of the second vehicle from the second lane to the first lane comprises the following steps. A driving course of the second vehicle is determined and road markings of the first lane and/or the second lane are determined. Furthermore, a comparison is made between the determined driving course of the second vehicle with the determined road markings of the first lane and/or the second lane. In particular, an approach of the driving course of the second vehicle to the determined road markings of the first vehicle can be assessed as an impending lane change of the second vehicle from the second lane to the first lane.

The last-mentioned embodiments have the advantage that with these an impending lane change can be determined simply and as reliably as possible.

In a further embodiment of the method, additionally an automatic transmission of a first message to the second vehicle is made by means of at least one vehicle-to-vehicle communication apparatus of the first vehicle for outputting a second warning message by means of at least one warning device of the second vehicle if $d1 \leq d0,1$. In addition to the first warning message by the signal device of the first vehicle, this embodiment advantageously outputs a second warning message by means of at least one warning apparatus of the second vehicle, whereby the driver of the second vehicle can also be warned by its own warning systems.

Furthermore, a warning message can be automatically output to occupants of the first vehicle, in particular a driver of the first vehicle, by means of at least one warning apparatus of the first vehicle if $d1 \leq d0,1$. As a result, along with the driver of the second vehicle, the driver of the first vehicle can also be warned of the critical driving situation in the form of an impending lane change of the second vehicle.

In a further embodiment, after the automatic output of the first warning message to the second vehicle by means of the at least one signal device of the first vehicle, the method comprises the following steps. A second distance d2 of the second vehicle from the first vehicle is determined and a second position of the second vehicle is determined. In addition, a comparison is made between the determined second distance d2 of the second vehicle from the first vehicle with a second predetermined threshold value $d0,2$, wherein the second predetermined threshold value $d0,2$ is direction-dependent, wherein $d0,2 < d0,1$ and wherein the determined second distance d2 of the second vehicle from the first vehicle is compared with the second predetermined threshold value $d0,2$ in the direction of the determined second position of the second vehicle. Furthermore, an automatic actuation of a braking apparatus and/or a steering apparatus of the first vehicle is made if $d2 \leq d0,2$. This embodiment has the advantage that in the event of a further approach of the second vehicle to the first vehicle, for example, as a result of the first warning message not being observed, a braking apparatus and/or a steering apparatus of the first vehicle is automatically actuated and as a result, an avoidance of the first vehicle can be executed, for example, if the second vehicle wished to change to the first lane directly alongside the first vehicle.

Additionally an automatic transmission of a second message to the second vehicle can be made by means of at least one vehicle-to-vehicle communication apparatus of the first vehicle for automatic actuation of a braking apparatus and/or a steering apparatus of the second vehicle if $d2 \leq d0,2$. By this means, an automatic avoidance manoeuvre of the second vehicle can be initiated in order, for example, to steer back to the second lane.

The first vehicle and/or the second vehicle is preferably a motor vehicle, in particular a passenger car or a lorry.

A control apparatus is also provided for a driver assistance system for the avoidance or mitigation of a collision between a first vehicle driving in a first lane and a second vehicle driving in a second lane when the second vehicle changes lane from the second lane to the first lane. The control apparatus is part of the first vehicle. The control apparatus comprises a first detecting apparatus configured to determine an impending lane change of the second vehicle from the second lane to the first lane and a second detecting apparatus configured to determine a first distance d1 of the second vehicle from the first vehicle. The control apparatus further comprises a third detecting apparatus configured to determine a first position of the second vehicle and a comparing apparatus configured to compare the determined first distance d1 of the second vehicle from the first vehicle with a first predetermined threshold value $d0,1$, wherein the first predetermined threshold value $d0,1$ is direction-dependent and wherein the determined first distance d1 of the second vehicle from the first vehicle is compared with the first predetermined threshold value $d0,1$ in the direction of the determined first position of the second vehicle. Furthermore, the control apparatus comprises an output apparatus configured to automatically output a first warning message to the second vehicle by means of at least one signal device of the first vehicle if $d1 \leq d0,1$.

The application further relates to a vehicle comprising a control apparatus for a driver assistance system of the vehicle according to the said embodiment.

The driver assistance system can be part of an active safety system of the vehicle, in particular a system for distance regulation ("Adaptive Cruise Control", ACC) or an emergency braking system. The driver assistance system can furthermore be part of a parking assistance system.

The vehicle is preferably a motor vehicle, in particular a passenger car or a lorry.

The control apparatus and the vehicle exhibit the advantages already specified in connection with the first embodiment of the method which are not listed again at this point to avoid repetitions.

A computer program is also provided which, when executed on a processor of a control apparatus for a driver assistance system for the avoidance or mitigation of a collision between a first vehicle driving in a first lane and a second vehicle driving in a second lane when the second vehicle changes lane from the second lane to the first lane, instructs the control apparatus to execute the following steps. The control apparatus is instructed to determine an impending lane change of the second vehicle from the second lane to the first lane by means of at least one first detecting apparatus of the first vehicle and to determine a first distance d1 of the second vehicle from the first vehicle by means of at least one second detecting apparatus of the first vehicle. In addition, the control apparatus is instructed to determine a first position of the second vehicle by means of at least one third detecting apparatus of the first vehicle and to compare the determined first distance d1 of the second vehicle from the first vehicle with a first predetermined threshold value d0,1, wherein the first predetermined threshold value d0,1 is direction-dependent and wherein the determined first distance d1 of the second vehicle from the first vehicle is compared with the first predetermined threshold value d0,1 in the direction of the determined first position of the second vehicle. The control apparatus is further instructed to automatically output a first warning message to the second vehicle by means of at least one signal device of the first vehicle if d1≤d0,1. The control apparatus is in this case part of the first vehicle.

A computer-readable medium is also provided on which a computer program according to the embodiment just specified is stored.

The computer program and the computer-readable medium exhibit the advantages already specified in connection with the first embodiment of the method which are not listed again at this point to avoid repetitions.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
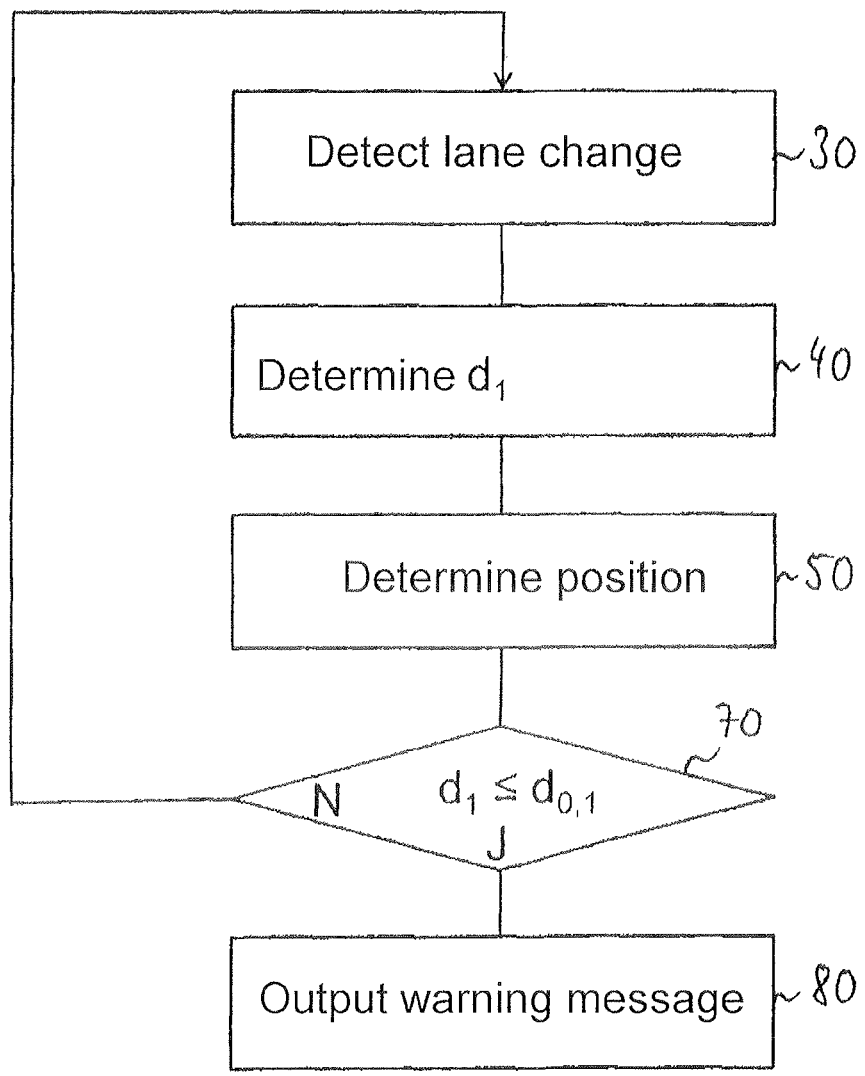
FIG. 1 shows a flow diagram of a method for the avoidance or mitigation of a collision between a first vehicle driving in a first lane and a second vehicle driving in a second lane when the second vehicle changes lane from the second lane to the first lane according to one embodiment.

FIG. 1 shows a flow diagram of a method for the avoidance or mitigation of a collision between a first vehicle driving in a first lane and a second vehicle driving in a second lane when the second vehicle changes lane from the second lane to the first lane according to one embodiment.

In step 30, an impending lane change of the second vehicle from the second lane to the first lane is determined by means of at least one detecting apparatus of the first vehicle. The determination of the impending lane change of the second vehicle from the second lane to the first lane can include a determination of a driving course of the first vehicle, a determination of a driving course of the second vehicle and a comparison of the determined driving course of the second vehicle with the determined driving course of the first vehicle. Furthermore, the determination of the impending lane change of the second vehicle from the second lane to the first lane can include a determination of a driving course of the second vehicle, a determination of a road markings of the first lane and/or the second lane and a comparison of the determined driving course of the second vehicle with the determined road markings of the first lane and/or the second lane.

In a step 40, a first distance d1 of the second vehicle from the first vehicle is determined by means of at least one second detecting apparatus of the first vehicle. Furthermore, in step 50 a first position of the second vehicle is determined by means of at least one third detecting apparatus of the first vehicle. The steps 40 and 50 can also be executed in reverse order, i.e., a first position of the second vehicle can first be determined and then the first distance d1 of the second vehicle from the first vehicle can be determined. The second detecting apparatus and/or the third detecting apparatus can include at least one element selected from the group consisting of an optical sensor, in particular a camera, an acoustic sensor, in particular an ultrasound sensor, a radar sensor and a lidar sensor.

In a step 70, the determined first distance d1 of the second vehicle from the first vehicle is compared with a first pre-determined threshold value d0,1. The first pre-determined threshold value d0,1 is direction-dependent. The determined first distance d1 of the second vehicle from the first vehicle is in this case compared with the first pre-determined threshold value d0,1 in the direction of the determined first position of the second vehicle.

If d1>d0,1, steps 30, 40 and 50 are repeated. If d1≤d0,1, in step 80 the first warning message is automatically output to the second vehicle by means of at least one signal device of the first vehicle. The at least one signal device can include a headlamp and/or a horn.

Figure 2:
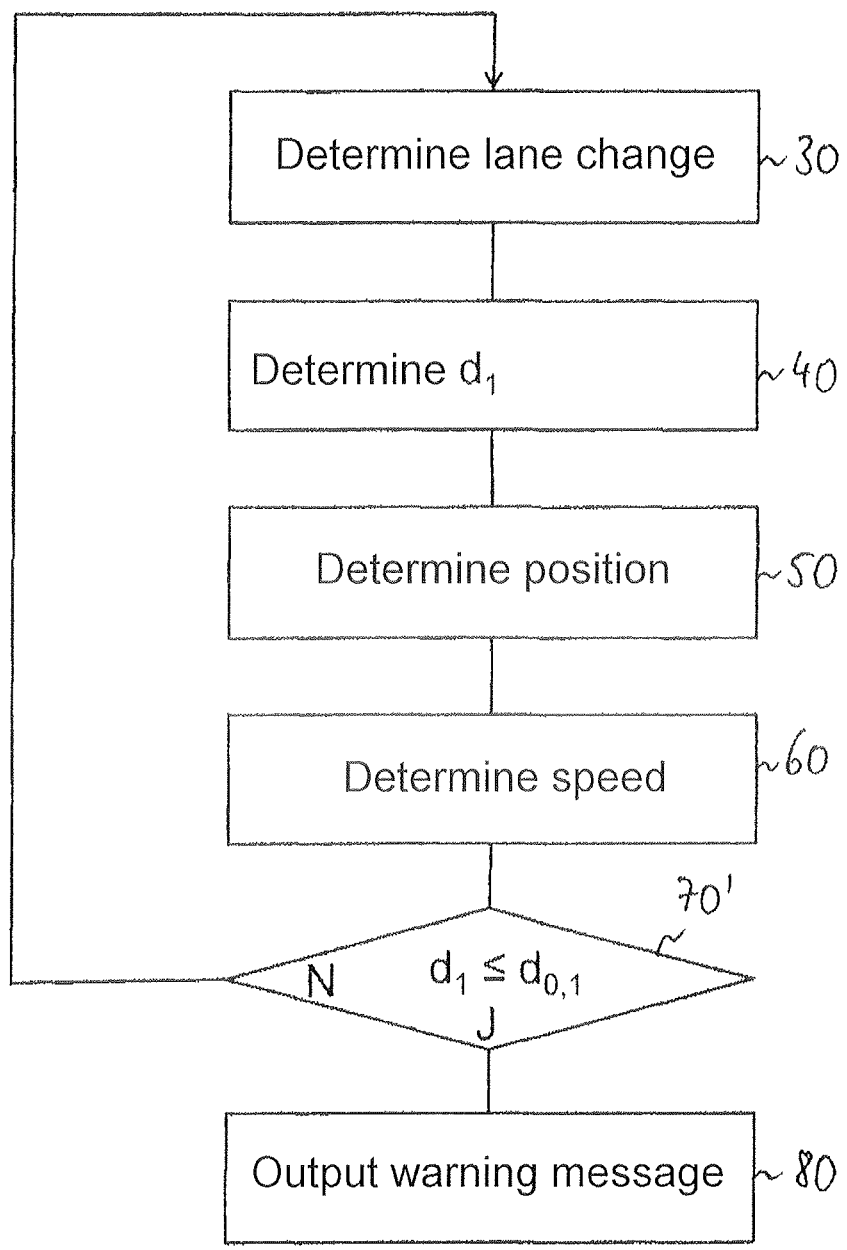
FIG. 2 shows a flow diagram of a method for the avoidance or mitigation of a collision between a first vehicle driving in a first lane and a second vehicle driving in a second lane when the second vehicle changes lane from the second lane to the first lane according to a further embodiment.

FIG. 2 shows a flow diagram of a method for the avoidance or mitigation of a collision between a first vehicle driving in a first lane and a second vehicle driving in a second lane when the second vehicle changes lane from the second lane to the first lane according to a further embodiment of the invention. Components having the same functions as in FIG. 1 are characterised with the same reference numbers and not discussed in detail hereinafter.

The embodiment shown differs from the embodiment shown in FIG. 1 in that the first pre-determined threshold value d0,1 is additionally speed-dependent and in addition to steps 30, 40 and 50, a step 60 is carried out in which a speed v of the second vehicle is determined, for example, by means of a radar sensor. Then in a step 70' the determined first distance d1 of the second vehicle from the first vehicle is compared with the first pre-determined threshold value d0,1 in the direction of the determined first position of the second vehicle and dependent on the determined speed v of the second vehicle.

If d1>d0,1, steps 30, 40, 50 and 60 are repeated. If d1≤d0,1, in step 80 a first warning message is automatically output to the second vehicle by means of at least one signal device of the first vehicle.

The step 60 of determining the speed v of the second vehicle can include a determination of the speed of the second vehicle relative to the first vehicle, in particular a determination of the magnitude of the speed of the second vehicle relative to the first vehicle. In this case, the determined first distance d1 of the second vehicle from the first vehicle in step 70' can be compared with the first pre-determined threshold value d0,1 in the direction of the determined first position of the second vehicle and dependent on the determined speed of the second vehicle relative to the first vehicle.

Figure 3:
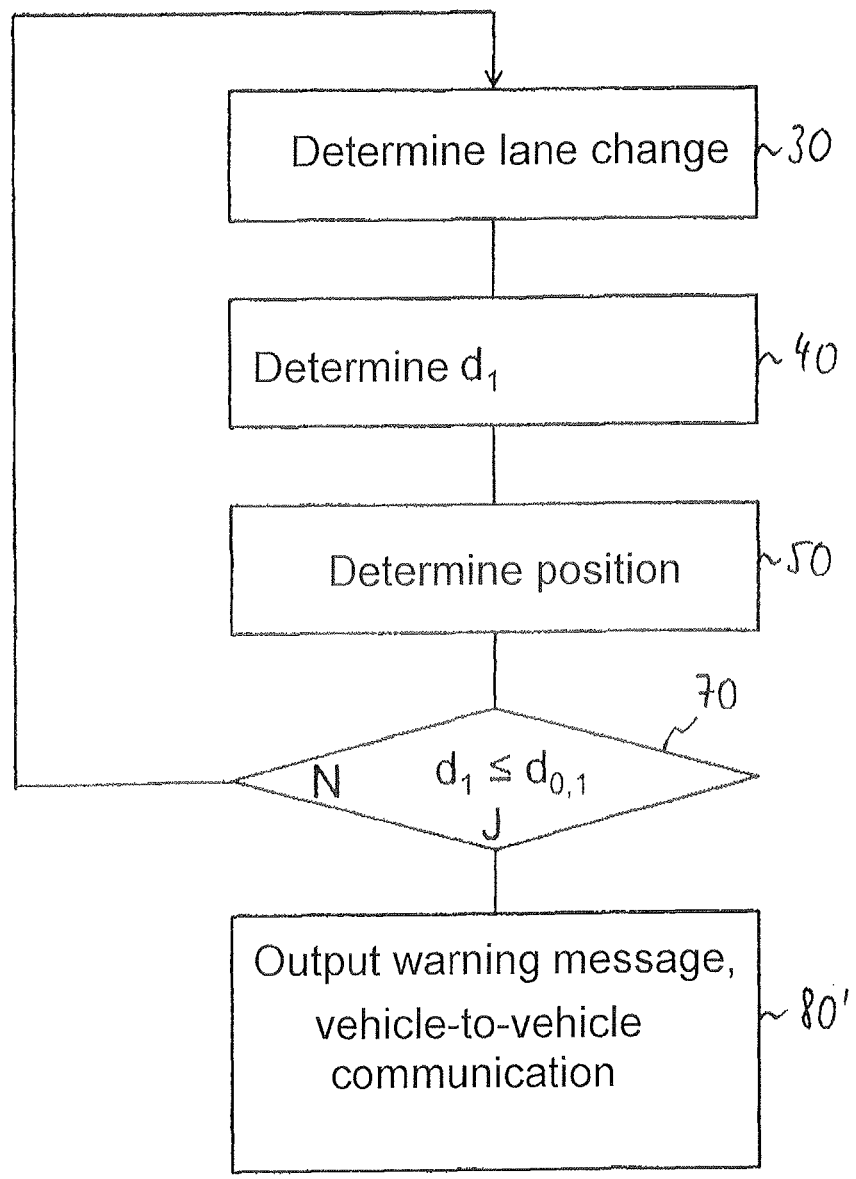
FIG. 3 shows a flow diagram of a method for the avoidance or mitigation of a collision between a first vehicle driving in a first lane and a second vehicle driving in a second lane when the second vehicle changes lane from the second lane to the first lane according to a further embodiment.

FIG. 3 shows a flow diagram of a method for the avoidance or mitigation of a collision between a first vehicle driving in a first lane and a second vehicle driving in a second lane when the second vehicle changes lane from the second lane to the first lane according to a further embodiment of the invention. Components having the same functions as in the preceding figures are characterised with the same reference numbers and not discussed in detail hereinafter.

The embodiment shown in FIG. 3 differs from the previously shown embodiments in that in a step 80' a first warning message is automatically output to the second vehicle by means of at least one signal device of the first vehicle and in addition, a first message is automatically transmitted to the second vehicle by means of a vehicle-to-vehicle communication apparatus of the first vehicle for outputting a second warning message by means of at least one warning apparatus of the second vehicle if d1≤d0,1.

In addition, this embodiment can include a step, not shown, to determine a speed of the second vehicle if the first pre-determined threshold value d0,1 is additionally speed-dependent.

Figure 4:
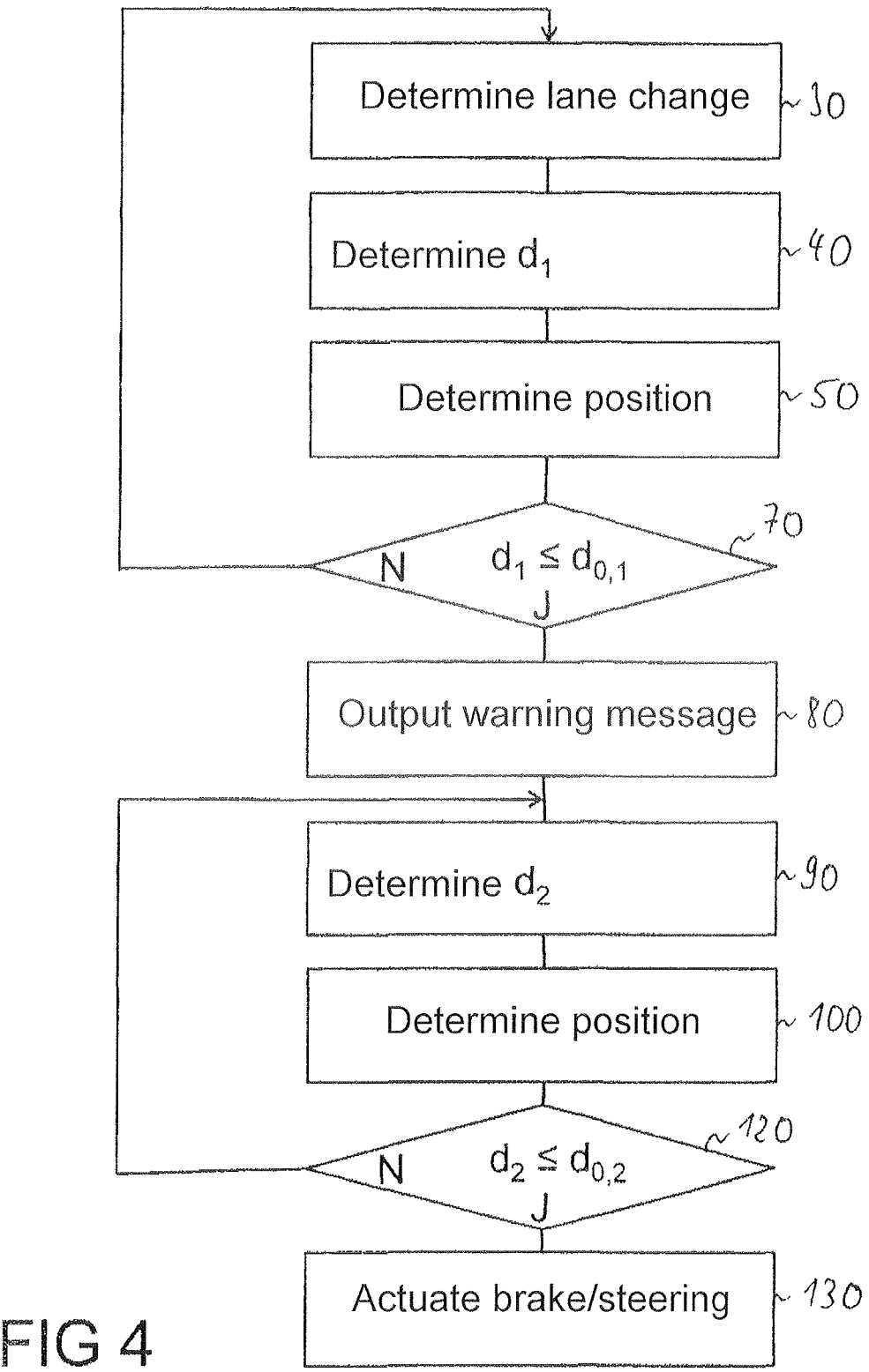
FIG. 4 shows a flow diagram of a method for the avoidance or mitigation of a collision between a first vehicle driving in a first lane and a second vehicle driving in a second lane when the second vehicle changes lane from the second lane to the first lane according to a further embodiment.

FIG. 4 shows a flow diagram of a method for the avoidance or mitigation of a collision between a first vehicle driving in a first lane and a second vehicle driving in a second lane when the second vehicle changes lane from the second lane to the first lane according to a further embodiment of the invention. Components having the same functions as in the preceding figures are characterised with the same reference numbers and not discussed in detail hereinafter.

In this embodiment, after the automatic output of the first warning message to the second vehicle in step 80, in a step 90 a second distance d2 of the second vehicle to the first vehicle is determined. Furthermore, in step 100 a second position of the second vehicle is determined and in a step 120 the determined second distance d2 of the second vehicle to the first vehicle is compared with the second pre-determined threshold value d0,2, wherein the second pre-determined threshold value d0,2 is direction-dependent and wherein d0,2<d0,1. The determined second distance d2 of the second vehicle to the first vehicle is compared with the second pre-determined threshold value d0,2 in the direction of the determined second position of the second vehicle.

If d2>d0,2, steps 90 and 100 are repeated. If d2≤d0,2, in a step 130 a braking apparatus and/or a steering apparatus of the first vehicle is automatically actuated for automatic avoidance of the first vehicle.

Furthermore, this embodiment can include a step, not shown, for determining a speed of the second vehicle if the second pre-determined threshold value d0,2 is additionally speed-dependent.

Steps 90 and 100 can also be carried out in reverse order, i.e. firstly the second position of the second vehicle can be determined and then the second distance d2 of the second vehicle to the first vehicle can be determined.

Figure 5:
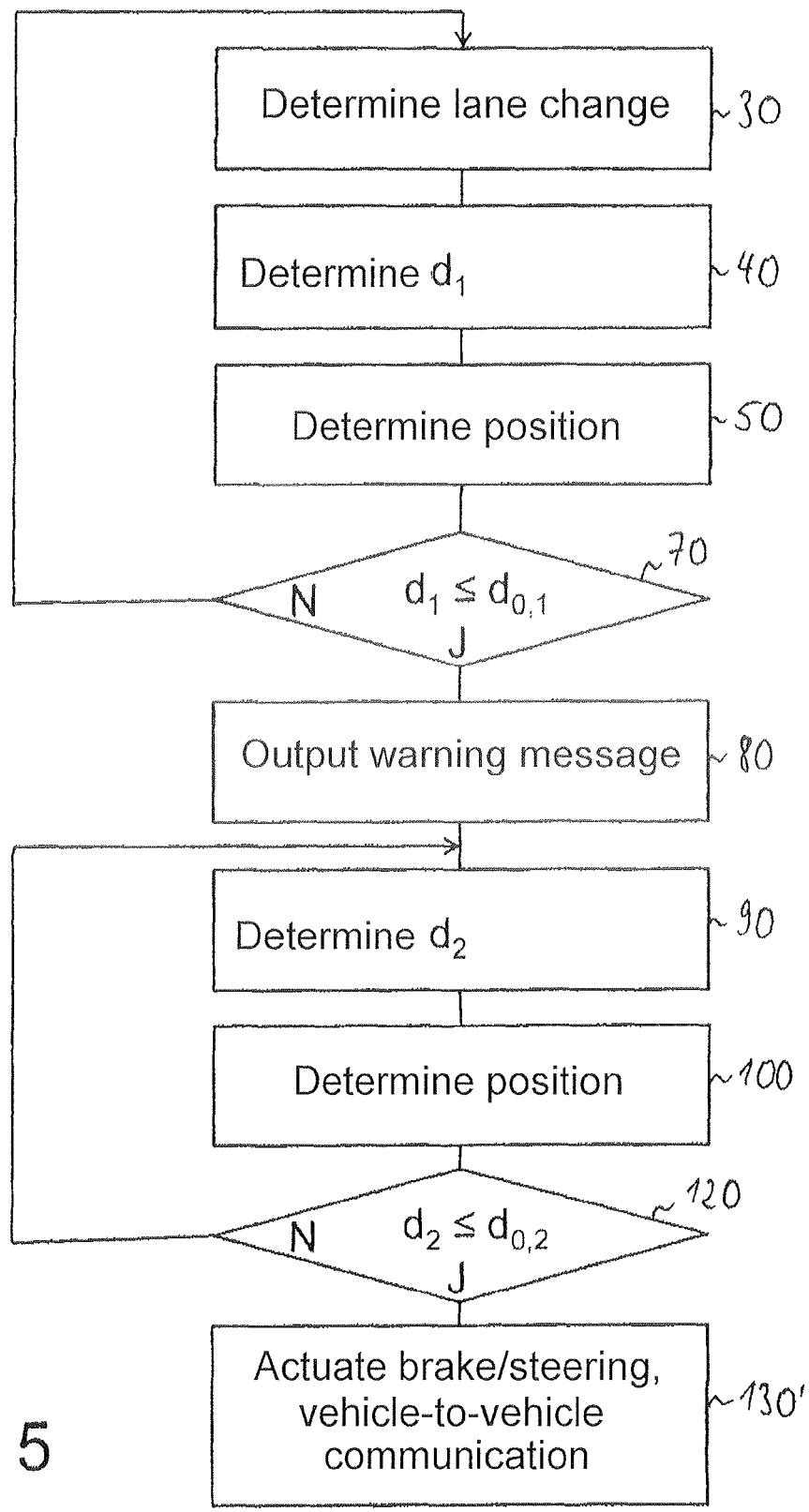
FIG. 5 shows a flow diagram of a method for the avoidance or mitigation of a collision between a first vehicle driving in a first lane and a second vehicle driving in a second lane when the second vehicle changes lane from the second lane to the first lane according to a further embodiment.

FIG. 5 shows a flow diagram of a method for the avoidance or mitigation of a collision between a first vehicle driving in a first lane and a second vehicle driving in a second lane when the second vehicle changes lane from the second lane to the first lane according to a further embodiment of the invention. Components having the same functions as in the preceding figures are characterised with the same reference numbers and not discussed in detail hereinafter.

This embodiment differs from the embodiment shown in FIG. 4 in that in a step 130', in addition to an automatic actuation of a braking apparatus and/or a steering apparatus of the first vehicle, a second message is automatically transmitted to the second vehicle by means of at least one vehicle-to-vehicle communication apparatus of the first vehicle for the automatic actuation of a braking apparatus and/or a steering apparatus of the second vehicle if d2≤d0,2, in order to enable an automatic avoidance of the second vehicle.

Furthermore, this embodiment can include a step, not shown for determining a speed of the second vehicle if the second pre-determined threshold value d0,2 is additionally speed-dependent.

Figure 6:
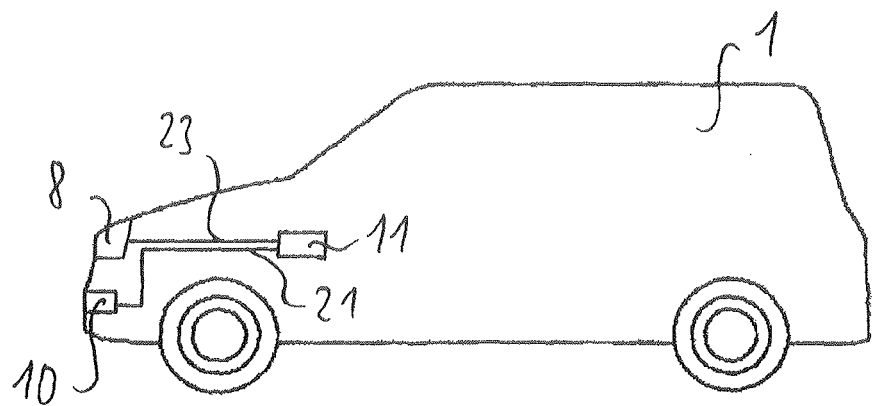
FIG. 6 shows a vehicle having a control apparatus for a driver assistance system of the vehicle according to one embodiment.

FIG. 6 shows a vehicle 1 according to one embodiment. In the embodiment shown the vehicle 1 is a motor vehicle in the form of a passenger car.

The vehicle 1 has a schematically depicted control apparatus 11 for a driver assistance system of the vehicle 1 not shown in detail. The control apparatus 11 is connected via a signal line 21 to a radar sensor 10 which is disposed in a frontal region of the vehicle 1. Furthermore the control apparatus 11 is connected via a control and signal line 23 to at least one headlamp 8 of the vehicle 1. Further details of the control apparatus 11 are explained in detail in connection with the following figure.

Figure 7:
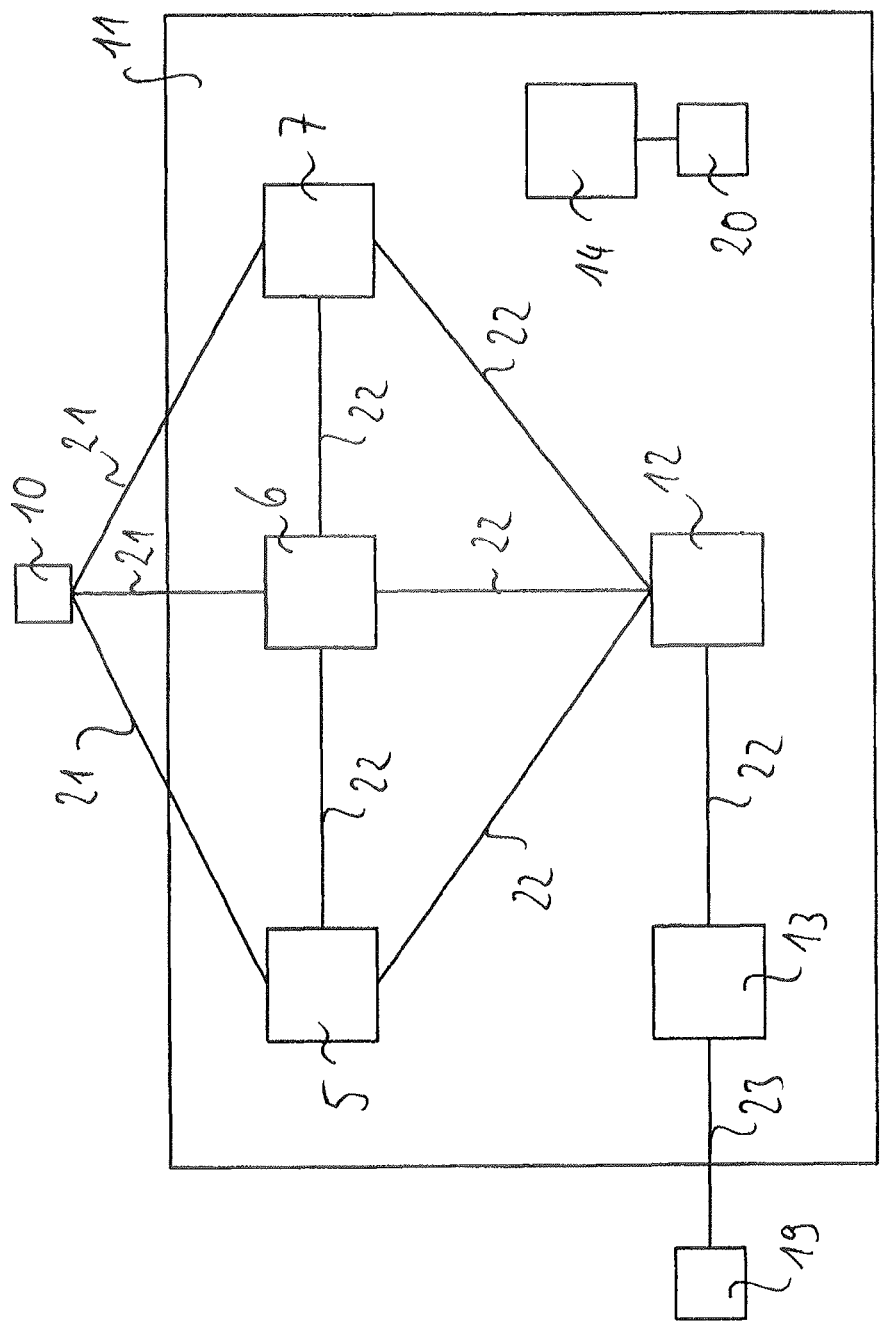
FIG. 7 shows the control apparatus for the driver assistance system of the vehicle according to FIG. 6.

FIG. 7 shows the control apparatus 11 for the driver assistance system not shown in detail in FIG. 7 for the avoidance or mitigation of a collision between a first vehicle driving in a first lane and a second vehicle driving in a second lane when the second vehicle changes lane from the second lane to the first lane. The control apparatus is part of the vehicle according to FIG. 6. Components having the same functions as in FIG. 6 are characterised with the same reference numbers and not discussed in detailed hereinafter.

The control apparatus 11 comprises a first detecting apparatus 5 which is configured to determine an impending lane change of the second vehicle from the second lane to the first lane. In addition, the control apparatus 11 comprises a second detecting apparatus 6 which is configured to determine a first distance d1 of the second vehicle from the first vehicle and a third detecting apparatus 7 which is configured to determine a first position of the second vehicle.

In the embodiment shown, the first detecting apparatus 5, the second detecting apparatus 6 and the third detecting apparatus 7 comprise a common sensor in the form of a radar sensor 10. The first detecting apparatus 5, the second detecting apparatus 6 and the third detecting apparatus 7 are in each case connected via a signal line 21 to the radar sensor 10. In addition to the radar sensor 10, the first detecting apparatus 5, the second detecting apparatus 6 and/or the third detecting apparatus 7 are connected to an optical sensor, in particular a camera, an acoustic sensor, in particular an ultrasound sensor and/or a lidar sensor.

The control apparatus 11 further comprises a comparing apparatus 12 which is configured to compare the determined first distance d1 of the second vehicle from the first vehicle with a first pre-determined threshold value d0,1, wherein the first pre-determined threshold value d0,1 is direction-dependent and wherein the determined first distance d1 of the second vehicle from the first vehicle is compared with the first pre-determined threshold value d0,1 in the direction of the determined first position of the second vehicle. The values of the first pre-determined threshold value d0,1 can be stored on a storage apparatus, not shown, of the control apparatus 11.

The control apparatus 11 further comprises an output apparatus configured to automatically output a first warning message to the second vehicle by means of at least one signal device 19 of the first vehicle if d1≤d0,1. To this end, the output apparatus 13 is connected via a control and signal line 23 to the signal device 19 of the first vehicle. The signal device 19 can, for example, include at least one headlamp and/or at least one horn.

The first detecting apparatus 5, the second detecting apparatus 6, the third detecting apparatus 7 and the comparing apparatus 12 are connected to one another via connecting lines 22. In addition, the comparing apparatus 12 is connected to the output apparatus 13 via a connecting line 22. The connecting lines 22 can be implemented, at least in part, with the aid of a CAN bus of the vehicle.

In the embodiment shown, the control apparatus 11 comprises a processor 14 and a computer-readable medium 20, a computer program being stored on the computer-readable medium 20, which, when executed on the processor 14 of the control apparatus 11, instructs the control apparatus 11 to execute the said steps by means of the said elements of the control apparatus 11. To this end, the processor 14 is connected in a manner not shown in detail directly or indirectly to the first detecting apparatus 5, the second detecting apparatus 6, the third detecting apparatus 7, the comparing apparatus 12 and the output apparatus 13.

Figure 8A:
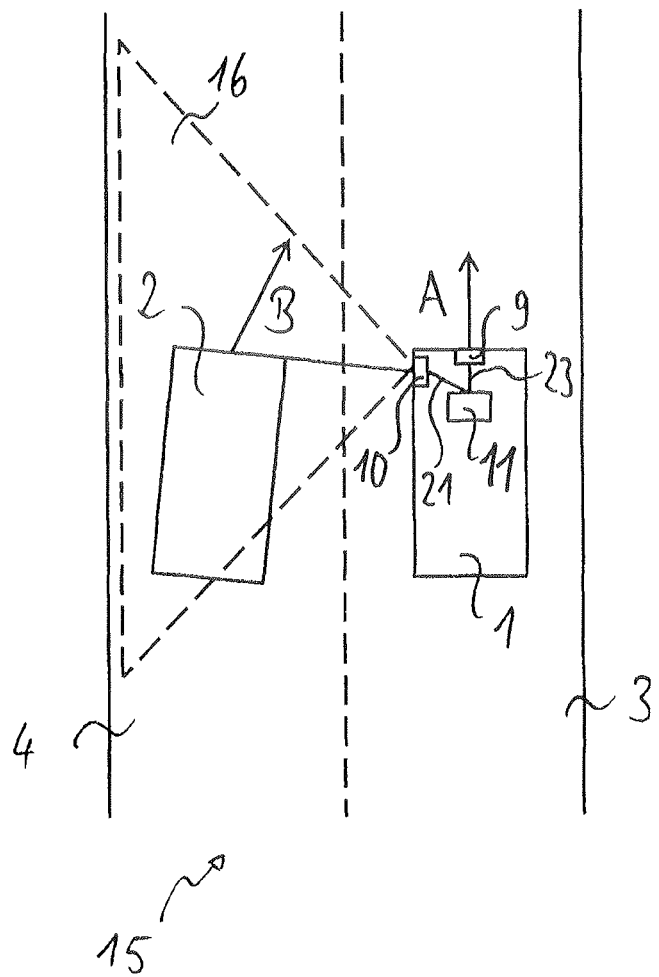
FIGS. 8A and 8B show examples of traffic situations in which the method for the avoidance or mitigation of a collision according to FIG. 1 to FIG. 5 can be used.
Figure 8B:
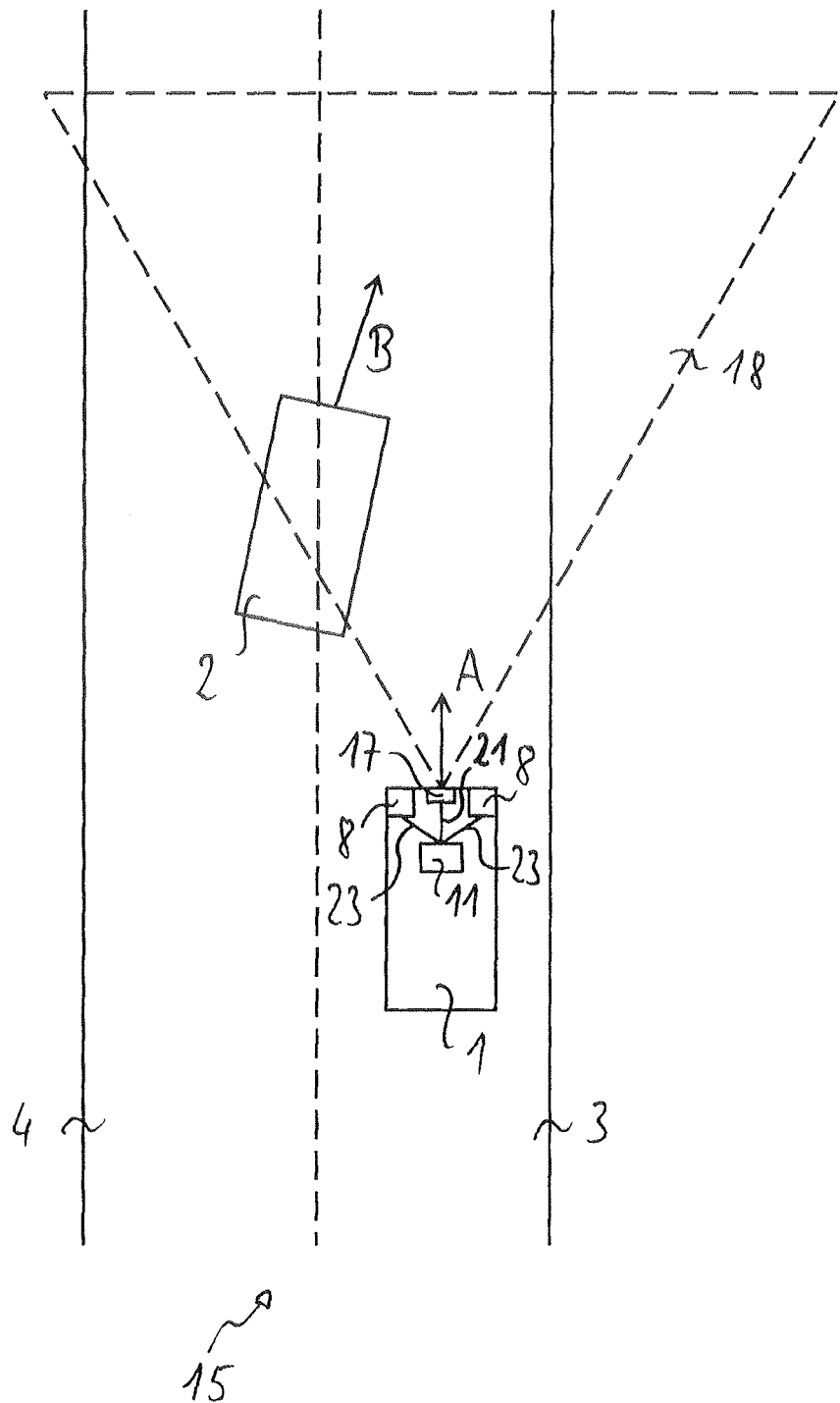

FIG. 8A and FIG. 8B show examples of traffic situations in which the method for the avoidance or mitigation of a collision, in particular according to FIG. 1 to FIG. 5, can be used. Components having the same functions as in FIG. 6 and FIG. 7 are characterised with the same reference numbers and not discussed in detailed hereinafter.

FIG. 8A shows a first traffic situation. In this situation a first vehicle 1 having a speed depicted schematically by an arrow A is driving in a first lane 3 of a road 15. A second vehicle 2 having a speed depicted schematically by an arrow B is driving in a second lane 4 of the road 15. In the embodiment shown the road 15 therefore contains the first lane 3 and the second lane 4 in the same direction. The road 15 for example comprises a two-lane motorway.

The second vehicle 2 is just about to make a lane change from the second lane 4 to the first lane 3. In the traffic situation shown in FIG. 8A, the first vehicle 1 and the second vehicle 2 are driving alongside one another so that the first vehicle 1 is located in a blind spot of the second vehicle 2 and conversely.

However, the second vehicle 2 is located at least partially within a schematically depicted detection range 16 of a radar sensor 10 of the first vehicle 1. The first vehicle 1 can thereby detect by means of the control apparatus 11 the impending lane change of the second vehicle from the second lane 4 to the first lane 3 and automatically output a first warning message to the second vehicle 2 by means of at least one signal device of the first vehicle 1 which is configured in the embodiment shown as a horn 9.

In the embodiment shown the control apparatus 11 is, for example, part of a parking assistance system of the first vehicle 1.

In addition, the first vehicle 1 can, additionally or alternatively to the radar sensor 10, have an optical sensor, in particular a camera, an acoustic sensor, in particular an ultrasound sensor and/or a lidar sensor.

FIG. 8B shows a second traffic situation. Components having the same functions as in FIG. 8A are characterised with the same reference numbers and not discussed in detailed hereinafter.

The traffic situation shown differs from the traffic situation shown in FIG. 8A in that the second vehicle 2 makes a lane change from the second lane 4 to the first lane 3 ahead of the first vehicle 1. In this case, the lane change of the second vehicle 2 is made at too close a distance from the first vehicle 1.

The second vehicle 2 is located at least partially within a schematically depicted detection range 18 of a radar sensor 17 of the first vehicle, whereby the lane change of the second vehicle 2 from the second lane 4 to the first lane 3 can be determined by the control apparatus 11 and a first warning message can be automatically output to the second vehicle 2 by means of at least one signal device of the first vehicle 1 which in the embodiment 2 shown includes a headlamp 8.

In the embodiment shown, the control apparatus is, for example, part of an active safety system of the first vehicle 1, for example of a system for regulating distance ("Adaptive Cruise Control", ACC) or an emergency braking system.

In addition, the first vehicle 1 can, additionally or alternatively to the radar sensor 10, have an optical sensor, in particular a camera, an acoustic sensor, in particular an ultrasound sensor and/or a lidar sensor.

The present application starts from the consideration that present-day active safety systems, for example, based on radar, laser, ultrasound and/or camera systems, evaluate driving manoeuvres of other road users (in relation to the first vehicle) and warn the vehicle driver of his own, i.e. the first vehicle of any accident risk (e.g. Forward Distance Indicator, Forward Collision Alert, Side Blind Zone Detection) and optionally even initiate driving manoeuvres which avoid an accident or mitigate the consequences of an accident (e.g. Collision Mitigation Braking).

The application uses the available data on the driving manoeuvres of other vehicle drivers, evaluates the data and in the case of critical driving manoeuvres of other vehicle drivers, transmits corresponding bus signals to the signal devices of his own vehicle. Critical driving manoeuvres can in particular be a lane change of another vehicle to my lane at too close a distance depending on the relative speed or a lane change of another vehicle to my lane although both vehicles are driving alongside one another, i.e. in the blind spot.

The signal devices of my vehicle (relative to the driver of the first vehicle) react in various ways according to the detected critical driving manoeuvre. Possible reactions can be an automatic headlamp flashing, for example, if another vehicle changes to my lane too closely in front of my vehicle and/or an automatic horn, for example, if another vehicle wished to change to my lane directly alongside me. In addition, an automatic braking and avoidance can take place, for example, if another vehicle wished to change to my lane directly alongside me, a triggering of a car-to-car communication with the aim of warning the driver of the other vehicle through its on-board warning system and/or a triggering of a car-to-car communication with the aim of initiating an automatic avoidance manoeuvre of the other vehicle, in order for example to steer back to the other lane.

Although at least one exemplary embodiment has been shown in the preceding description, various amendments and modifications can be made. The said embodiments are merely examples and are not intended to restrict the range of validity, the applicability or the configuration in any way. On the contrary, the preceding description provides the person skilled in the art with a plan for implementing at least one exemplary embodiment, wherein numerous amendments in the function and the arrangement of elements described in an exemplary embodiment can be made without departing from the scope of protection of the attached claims and their legal equivalents.

The invention claimed is:

1. A method for at least mitigation of a collision between a first vehicle driving in a first lane and a second vehicle driving in a second lane when the second vehicle changes lane from the second lane to the first lane, comprising:
   determining an impending lane change of the second vehicle from the second lane to the first lane with a first detecting apparatus of the first vehicle;
   determining a first distance of the second vehicle from the first vehicle with a second detecting apparatus of the first vehicle;
   determining a first position of the second vehicle with a third detecting apparatus of the first vehicle;
   comparing the first distance of the second vehicle from the first vehicle with a first predetermined threshold value, wherein the first predetermined threshold value is direction-dependent and the first distance of the second vehicle from the first vehicle is compared with the first predetermined threshold value in a direction of the first position of the second vehicle; and
   generating a first warning message to the second vehicle with signal device of the first vehicle if the first distance≤the first predetermined threshold value.

2. The method according to claim 1,
   wherein the first predetermined threshold value is speed-dependent, and the method further comprising:
   determining a speed of the second vehicle; and
   comparing the first distance of the second vehicle from the first vehicle with the first predetermined threshold value in the direction of the first position of the second vehicle and the speed of the second vehicle.

3. The method according to claim 2,
   wherein the determining the speed of the second vehicle comprises determining the speed of the second vehicle relative to the first vehicle, and the method further comprises:
   comparing the first distance of the second vehicle from the first vehicle with the first predetermined threshold value in the direction of the first position of the second vehicle and the speed of the second vehicle relative to the first vehicle.

4. The method according to claim 1,
   wherein the signal device of the first vehicle comprises a headlamp, and
   wherein the generating the first warning message to the second vehicle includes an actuating the headlamp.

5. The method according to claim 1, wherein the signal device of the first vehicle comprises a horn and wherein generating the first warning message to the second vehicle includes an actuating of the horn.

6. The method according to claim 1, wherein the first detecting apparatus comprises a sensor.

7. The method according to claim 1, wherein the determining of the impending lane change of the second vehicle from the second lane to the first lane comprises:
   determining a first driving course of the first vehicle;
   determining a second driving course of the second vehicle; and
   comparing the second driving course with the first driving course.

8. The method according to claim 1, wherein the determining of the impending lane change of the second vehicle from the second lane to the first lane comprises:
   determining a driving course of the second vehicle;
   determining road markings of the first lane; and
   comparing the driving course with road markings of the first lane.

9. The method according to claim 1, further comprising transmitting a first message to the second vehicle with a one vehicle-to-vehicle communication apparatus of the first vehicle for generating a second warning message with a warning device of the second vehicle the first distance≤the first predetermined threshold value.

10. The method according to claim 1, wherein after transmitting the first warning message to the second vehicle with the signal device of the first vehicle, the method comprises:
    determining a second distance of the second vehicle from the first vehicle;
    determining a second position of the second vehicle;
    comparing the second distance of the second vehicle from the first vehicle with a second predetermined threshold value
    wherein the second predetermined threshold value is direction-dependent, wherein the second predetermined threshold value<the first predetermined threshold value, and
    wherein the second distance of the second vehicle from the first vehicle is compared with the second predetermined threshold value in the direction of the second position of the second vehicle; and
    actuating a control apparatus of the first vehicle if the second distance≤the second predetermined threshold value.

11. The method according to claim 10, further comprising transmitting a second message to the second vehicle with a one vehicle-to-vehicle communication apparatus of the first vehicle for actuation of a second control apparatus of the second vehicle if the second distance≤the second predetermined threshold value.

12. A control apparatus of a first vehicle for a driver assistance system for at least mitigation of a collision between the first vehicle driving in a first lane and a second vehicle driving in a second lane when the second vehicle changes lane from the second lane to the first lane, comprising:
    a first detecting apparatus configured to determine an impending lane change of the second vehicle from the second lane to the first lane;
    a second detecting apparatus configured to determine a first distance of the second vehicle from the first vehicle;
    a third detecting apparatus configured to determine a first position of the second vehicle;
    a comparing apparatus configured to compare the first distance of the second vehicle from the first vehicle with a first predetermined threshold value,
    wherein the first predetermined threshold value is direction-dependent, and wherein the first distance of the second vehicle from the first vehicle is compared with the first predetermined threshold value in a direction of the first position of the second vehicle; and an output apparatus configured to output a first warning message to the second vehicle with a signal device of the first vehicle if the first distance≤the first predetermined threshold value.

13. A computer readable medium embodying a computer program product, said computer program product comprising:

a driving assistance program for mitigation of a collision between a first vehicle driving in a first lane and a second vehicle driving in a second lane when the second vehicle changes lane from the second lane to the first lane, the driving assistance program configured to:

determine an impending lane change of the second vehicle from the second lane to the first lane by means of a first detecting apparatus of the first vehicle;

determine a first distance of the second vehicle from the first vehicle with a second detecting apparatus of the first vehicle;

determine a first position of the second vehicle with a third detecting apparatus of the first vehicle;

compare the first distance of the second vehicle from the first vehicle with a first predetermined threshold value wherein the first predetermined threshold value is direction-dependent;

compare the first distance of the second vehicle from the first vehicle with the first predetermined threshold value in a direction of the first position of the second vehicle; and produce a first warning message to the second vehicle with a signal device of the first vehicle if the first distance≤the first predetermined threshold value.

14. The computer readable medium according to claim 13, wherein the first predetermined threshold value is speed-dependent, and the driving assistance program is further configured to:

determine a speed of the second vehicle; and compare the first distance of the second vehicle from the first vehicle with the first predetermined threshold value in the direction of the first position of the second vehicle and the speed of the second vehicle.

15. The computer readable medium according to claim 14, wherein the driving assistance program is further configured to:

determine the speed of the second vehicle relative to the first vehicle; and compare the first distance of the second vehicle from the first vehicle with the first predetermined threshold value in the direction of the first position of the second vehicle and the speed of the second vehicle relative to the first vehicle.

16. The computer readable medium according to claim 14, wherein the driving assistance program is further configured to generate the first warning message to the second vehicle by an actuating a headlamp.

17. The computer readable medium according to claim 14, wherein the driving assistance program is further configured to generate the first warning message to the second vehicle with an actuating of a horn.

18. The computer readable medium according to claim 14, wherein the driving assistance program is further configured to:

determine a first driving course of the first vehicle;

determine a second driving course of the second vehicle; and compare the second driving course with the first driving course.

* * * * *